July 12, 1955
J. A. LOVE
2,712,718
LIFT-TYPE SPIKE HARROW
Filed Feb. 2, 1948
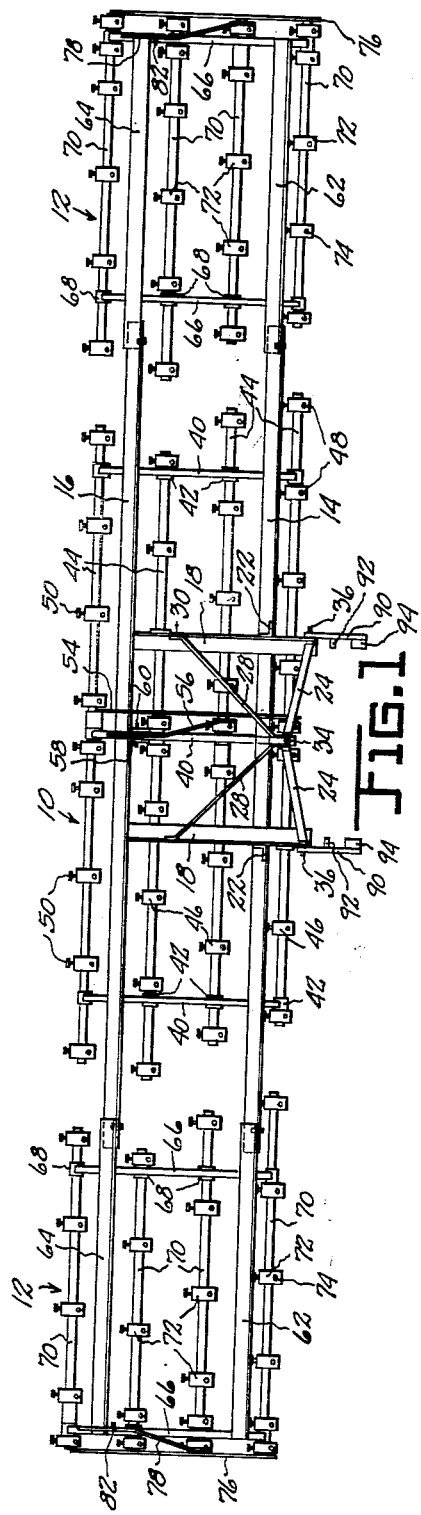
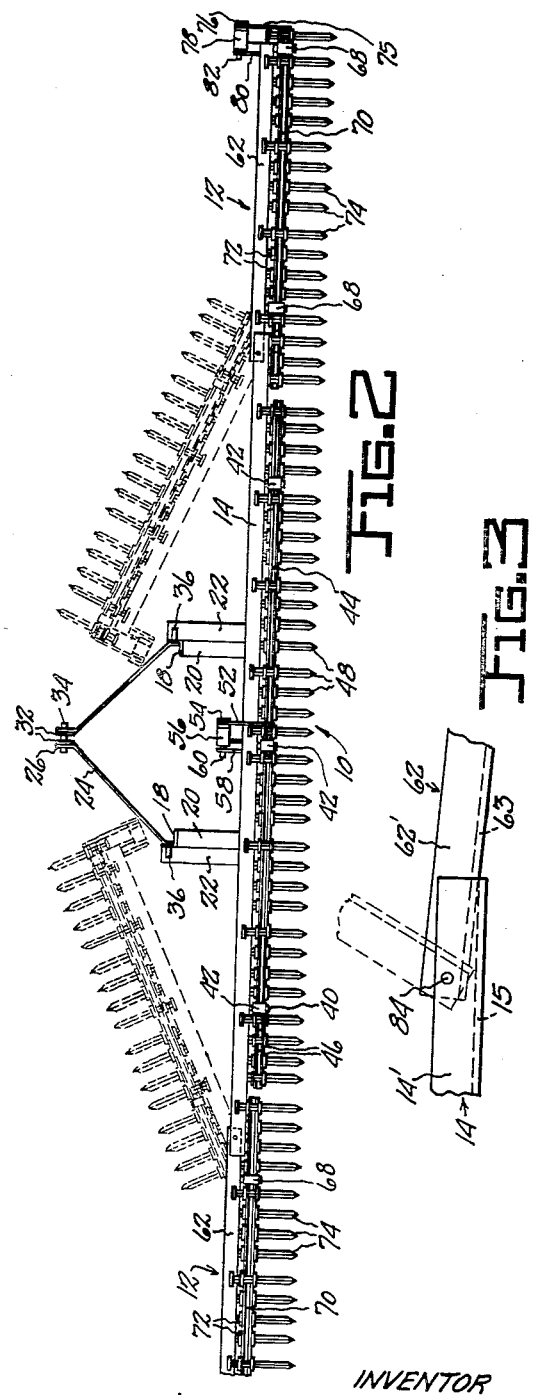
INVENTOR
JABEZ A. LOVE
BY
Oltsch + Knoblock
ATTORNEYS United States Patent Office 2,712,718
Patented July 12, 1955

2,712,718

LIFT-TYPE SPIKE HARROW

Jabez A. Love, Silver Creek Township, Cass County, Mich.

Application February 2, 1948, Serial No. 5,697

3 Claims. (Cl. 55—150)

This invention relates to a lift type spike harrow and has for its primary object the provision of a spike harrow having a working width which is much greater than the width of the tread of the wheels of the tractor used to pull the same and which at the same time is so constructed and arranged that it may be lifted to an elevated position by a conventional power-operated lift hitch carried by the tractor for transport and for turning of the tractor at a sharp angle in the operation of harrowing a field.

A further object is to provide a harrow of this type which is constructed of three rigid sections, each mounting a plurality of spikes or working elements, wherein said sections are arranged side by side and pivotally connected in a manner to permit the sections to shift to a limited extent relative to each other for the purpose of following the contour of the ground and also to permit said sections to be folded into compact arrangement for purposes of storage and for the purpose of permitting the implement to pass through a comparatively narrow opening, such as a fence gate opening.

A further object is to provide a device of this character having a rigid central harrow section including a rigid superstructure at the central portion of its front end providing on said central section three rigid points of connection with a tractor hitch at laterally and vertically spaced points, and a pair of rigid harrow sections pivotally at opposite ends of the central section in such a manner that the pivotal movement of the end sections relative to the central section is limited between a working position substantially in the plane of the center section and an inoperative collapsed position above the central section.

Other objects will be apparent from the following specification.

In the drawing:

Fig. 1 is a top plan view of the harrow.

Fig. 2 is a view of the harrow in front elevation with the end sections of the harrow shown in collapsed or folded position in dotted lines.

Fig. 3 is an enlarged fragmentary detail view illustrating the pivot connection between the central section and an end section of the harrow.

Referring to the drawing, the numeral 10 designates a central harrow section, and the numeral 12 designates end harrow sections.

The central harrow section has a front main transverse frame member 14 and a rear transverse main frame member 16. The frame members 14 and 16 are formed of rigid material, such as angle irons as illustrated, and are arranged in spaced horizontal parallel positions and are preferably of the same length. The frame parts 14 and 16 are connected together rigidly by a structure including rigid members 18 extending longitudinally of the harrow sections in equispaced relation to and at opposite sides of the center portion of the harrow. The members 18 are preferably bent at their rear ends to form vertical or upright portions 20 whose lower ends are welded or otherwise rigidly secured to the rear frame member 16. The members 18 project forwardly beyond the front frame member 14 and are supported adjacent their forward end portions by vertical rigid frame parts 22 bearing at their lower ends upon the frame members 14 and welded or otherwise secured at their opposite ends to the frame members 14 and 18. A pair of rigid bars 24 are fixedly secured at one end to the forward end of each of the two longitudinal frame members 18 and extend upwardly and slightly rearwardly in converging relation and terminate in spaced upper end portions 26. Cooperating with the bars 24 are a pair of bars 28 welded or otherwise fixedly secured at 30 to the frame members 18 adjacent the rear ends thereof, and these bars 28 extend forwardly and upwardly in converging relation to terminate in upper end parts 32. The upper end portions 26 and 32 are fixedly connected together by a cross-pin 34. The bars 24 and 28 thus cooperate to form a rigid superstructure mounted upon the main frame with the pin 34 connecting the upper ends thereof and positioned at the forward portion of the harrow section 10 and located in a vertical longitudinal plane substantially coinciding with the longitudinal center of the harrow section 10. A pair of rigid pins 36 project laterally and outwardly from the forward ends of the frame portions 18. The main frame parts are thus connected together by welding, by bolts or by any other suitable means in a manner to form a rigid frame unit having three connectors constituting the pin 34 and the two connector pins 36 which are adapted for connection of the three arms of a power-operated lift hitch mechanism of the type now commonly used in the art. It will be observed that the two connector pins 36 are positioned at the same level and are preferably axially aligned whereby they are adapted for connection with the tension or draft arms of the implement hitch, and the pin 34 is positioned centrally between the pins 36 and at a level thereabove whereby it is adapted for connection with the compression arm of a power lift hitch mechanism. The three points of connection, together with the rigid construction of the central section 10, permit a stable connection of the central section 10 to the tractor in such a way that operation of the hitch in a lifting direction will cause the central section to be lifted as a unit to a selected position above ground level or working level. It will be understood further that additional reinforcing means may be provided in the main frame of the section 10 as found desirable or necessary to withstand any stress or strain applied thereto in operation.

The main frame members 14 and 16 are also connected by a plurality of longitudinal crossbars 40, here illustrated as being respectively at the longitudinal center of said section and adjacent the opposite ends of the frame members 14 and 16. These crossbars are preferably welded or otherwise fixedly secured to frame members 14 and 16 and are positioned therebelow. The crossbars 40 are preferably of a length greater than the spacing between the frame members 14 and 16 with their forward ends projecting forwardly from the frame members 14 and their rear ends projecting rearwardly from the frame members 16. At substantially equal spaced relation along their length the crossbars 40 mount a plurality of bearings 42. Each of these bearings is longitudinally aligned with a bearing mounted on each of the other cross bars 40 and serves to journal a rigid bar 44, there being on the unit 10 a number of bars 44 equal to the number of bearings 42 upon each of the crossbars 40. The bars 40 are positioned to extend horizontally transversely of the section 10 parallel to the frame members 14 and 16 and at a level below the level of said frame members 14 and 16. The bars 44 are preferably arranged in staggered relation, as illustrated in Fig. 1, and are shorter than the frame members 14 and 16, each terminating in inwardly spaced relation to the ends of said frame members 14 and 16. Each of the arms 44 mounts a plurality of brackets 46 in substantially equally spaced relation along its length. These brackets may be of any suitable construction and preferably are of the construction illustrated in my co-pending application for spike mounting bracket, Ser. No. 776,283, filed September 26, 1947, now abandoned. Such brackets constitute U-shaped metal stampings whose opposed arms are positioned substantially horizontally with their free ends positioned foremost and provided with registering apertures to receive a spike 48 therethrough. The spike is positioned vertically and projects below the bracket, and its edge bears against the front edge of the bar 44. The rear bight portion of the horizontal bracket has a bolt 50 threaded therein with its free end bearing against the rear side of the bar 44, whereby said bar 44 is clamped between the spike tooth 48 and the bolt 50 at opposite sides thereof. It will be understood, of course, that this construction of spike bracket is illustrative only and that any other type of bracket found suitable may be employed. The bars 44 are preferably channel irons with the central plane of the channel positioned horizontally and the free edges of the legs of the channel positioned foremost for engagement with the spike tooth 48. Because of the staggered relation of the bars 44 and the similarly spaced arrangement of the tooth-mounting brackets 46 therealong, each of the teeth 48 is spaced or offset transversely from the remaining adjacent teeth mounted on other bars 44, and each of the teeth thus has a separate working path, in the manner well understood in the art.

Each of the bars 44 has fixedly connected thereto, as by welding, an upwardly projecting arm 52. The arms 52 on the respective bars 44 are preferably longitudinally aligned and substantially centrally positioned and are pivotally connected at their upper ends by a longitudinal substantially horizontal rigid link 54. The arms and link are so connected that the spike teeth 48 on each of the bars 44 will be parallel to the spike teeth on the other bars 44 regardless of the angular positioning of the arms 52; that is, if the spike teeth on one bar are positioned vertically, then the spike teeth on the other bars of the section 10 will similarly be positioned vertically; and, if any of the spikes are positioned at an inclination to the vertical, then all of the other spikes will be positioned at the same vertical inclination. A handle member 56 is pivotally connected to the link 54 preferably adjacent to the forward end of said link and projects rearwardly and substantially horizontally. As best seen in Fig. 1, the handle member 56 may be bent to offset relation so that its rear end portion overlies the central crossbar 40. A pair of rigid upright members 58 are secured at the rear end portion of the central crossbar 40, and the rear end of the handle 56 is adapted to be positioned therebetween. The rear end of the handle 56 preferably has a plurality of longitudinally spaced apertures formed therein, and the upper ends of the bars 58 have registering openings. A pin 60 may be inserted through the openings in the handle 56 and the members 58 and thus serves to lock the bars 44 in any rotative position for selected angular positioning of the spike teeth 48. This means for adjusting the angular positioning of the teeth 48 is illustrative only and it will be understood that any other means found suitable for controlling the inclination of the teeth 48 while maintaining all of the teeth 48 parallel may be used.

The outer end sections 12 of the harrow are provided with front transversely extending horizontal main frame members 62 and rear transversely extending main frame members 64. These frame members are rigid and, as here illustrated, constitute angle irons. The frame members 62 and 64 are rigidly connected by rigid crossbars 66 adjacent their opposite ends which are welded or otherwise secured thereto and extend therebelow. Thus the end frames constituting the parts 62, 64, 66 are of generally rectangular shape and of rigid construction. The crossbars 66 mount bearings 68 at spaced points along their lengths in which are journaled the tool bars 70 which extend transversely and are preferably aligned with the tool bars 44 of the central section. The bars 70 are arranged with at least their inner ends in staggered relation so that the inner end of each is spaced from the inner end of the adjacent bar 44 substantially the same distance as the ends of the other aligned bars 70 and 44 are spaced. Each of the bars 70 mounts a plurality of spaced brackets 72 similar to the brackets 46 of the bars 44 in the main section and serving to mount the spike bars 74 in the same manner described above. Each of the end sections 12 is similarly provided with means for adjusting the vertical inclination of the spikes 74 thereof, said means preferably being constructed similarly to the spike adjusting means used on section 10. Thus each of the bars 70 at its outer end may have an upwardly projecting arm 75 rigid thereon, and a link 76 may be pivotally connected to the upper ends of arms 75 and have pivotally connected thereto a handle 78 whose rear end portion lies adjacent to an upright 80 mounted upon the outer crossbar 66. A pin 82 right 80 may be used to lock the spike teeth 74 in selected inclination by passing the same through an opening in the upright 80 and a selected one of a longitudinal series of openings in the rear portion of the handle 78.

The inner ends of the frame members 62 and 64 of each of the end sections overlap the outer end portion of the adjacent one of the main frame portions 14 and 16, as best shown in Fig. 3. The lapping portions of the frame members are pivoted together by pivot pins 84 at the vertical webs of the overlapping parts. For example, the vertical web 14' of the member 14 is pivoted to the vertical web 62' of the frame member 62. The pivot 84 is so arranged that the horizontal flange of the frame member of the end member, such as the flange 63 shown in Fig. 3, is spaced slightly above the horizontal flange of the central main frame member, such as the flange 15 of the member 14, illustrated in Fig. 3. The pivots 84 at the front and rear main frame members of the joined sections are aligned longitudinally and are arranged coaxially. Consequently, the end section 12 is pivoted about a longitudinal horizontal axis which permits the end section 12 to swing from its horizontal position illustrated in full lines in Fig. 2, to a collapsed or folded position illustrated in dotted lines in Fig. 2. As best shown in dotted line position in Fig. 2, the free ends of the sections 12 will bear against and be supported by the members 24 and 28 constituting the superstructure, although the fully pivoted position which the end sections 12 will assume will depend in part upon their width, and, if the same are narrow, said end sections 12 may lie substantially flat upon the outer ends of the central section 10. The position of the pivot 84, and particularly the spacing of the horizontal webs, such as the webs 63 and 15, will permit a limited downward tilting of the end sections relative to the central section. In the preferred embodiment this tilting is limited to a drop of only five or six inches at the outer end of each section relative to the level of the inner pivoted end of the section for end sections which are from four to five feet in length.

This harrow possesses all of the advantages of a conventional multiple section spike harrow, including width of cut, flexible connection of sections, adjustability of tooth mounting, and in addition, permits its mounting upon a tractor by means of a lift hitch to be elevated above the ground by the hitch whenever it is desirable so to raise the implement for either transport or maneuverability. Also, the implement has the additional advantage of being foldable or collapsible to compact form by simple manipulation which can be accomplished by one man quickly and easily so as to enable the implement to pass through a narrow opening, such as a barn door or a fence opening, without requiring disconnection of the implement from the tractor and without requiring disassembly of the implement. Observe in this connection that the user need not manipulate the full weight of the end sections 12 inasmuch as the inner ends thereof are pivoted to the center section 10, and as a result the weight which the user must lift to shift the end sections 12 to their collapsed position is limited in amount. The flexibility of this implement is another important advantage, particularly in view of the great width of its cut. Thus, if the ground level varies between the points engaged by the opposite ends of the harrow, the end sections 12 may adjust themselves to differences in level compared to the level engaged by the central portion over which the tractor travels. The inclination of the harrow as a whole will be controlled by the inclination of the ground over which the tractor travels by virtue of the three-point connection, and, for level ground or ground having a uniform inclination, the three sections 10 and 12 will maintain a substantially coplanar relation. But in the event the ground at one side or the other of the tractor slants downwardly or upwardly relative to the ground over which the tractor travels, the pivots 84 will permit automatic adjustment of the end sections to accommodate themselves to the level of the ground engaged thereby. As mentioned above, the downward inclination is limited by virtue of the engagement of the webs of the overlapped frame parts, such as the webs 63 and 15 shown in Fig. 3, but this inclination can be so adjusted that it will conform substantially with the maximum lateral inclination which is likely to be encountered in a farm field which is subject to tillage.

If desired, the harrow may be provided with means to accommodate self-leveling operation thereof within predetermined limits, without sacrifice of the advantages derived from its connection to a tractor by a three-point lift hitch. Thus, a pair of short rigid links 90 may be pivotally connected at one end thereof to the pins 36. Each link carries a pin 92 projecting laterally therefrom at a point intermediate its length. The pins 92 form means to which the two tension arms of the lift hitch (not shown) may be pivotally connected. The front end of each link 90 has an ear or flange 94 projecting laterally thereof at its lower edge in a position to underlie the hitch arm connected at pin 92. By virtue of this arrangement, assuming that the tension arms of the hitch are pivoted at 92 and the compression arm of the hitch is pivoted at pin 34, the implement will be free to tilt rearwardly upwardly, or to tilt laterally a small extent, relative to the tractor. To lift the implement, the hitch arms are raised, causing the flanges 94 to engage the bottom edges of the hitch arms, thus holding the links 90 firmly as extensions of the hitch arms and transmitting the lift to bodily raise the implement.

The invention has been described and illustrated herein as applied to a spike tooth harrow. However, the invention is not limited to this usage, and may be incorporated in implements using ground working tools or elements other than spike teeth, in which event suitable mountings and brackets, as well understood in the art, will be used to mount the tools or elements upon the frames of the central and end sections in operative relation and in selected spacing and arrangement relative to said frames and to each other.

While the preferred construction of the device has been described and illustrated, changes may be made therein within the scope of the appended claims without departing from the spirit of the invention.

I claim:

1. A lift type spike harrow comprising a central section and two end sections, each section comprising a plurality of spike teeth and a rigid frame mounting said teeth and including front and rear transverse members, the frame of said central portion including a rigid central superstructure mounted at the front central portion thereof, at least three connectors carried by the frame of said central section in transversely and vertically spaced relation, the front and rear frame members of said sections being substantially aligned and pivoted together about aligned longitudinal axes, and means limiting downward pivoting of said end sections relative to said central section, a plurality of spike-mounting members rotatably carried by the frame of each of said central and end sections, means on each section for simultaneously rotating said spike-mounting members, and means for locking each rotating means to selected angular adjustment.

2. A lift type spike harrow comprising a central section and a pair of end sections, each section including spaced rigid front and rear frame members, rigid cross members fixedly interconnecting said front and rear frame members, certain cross members of each section mounting a plurality of bearings, a plurality of longitudinally spaced transverse tool bars journaled in said bearings, a plurality of spike teeth mounted on each tool bar, means on each section for simultaneously rotating said tool bars, means for locking each rotating means in selected adjustment, a rigid superstructure mounted at the front central portion of the frame of said central section, a plurality of spaced rigid connectors mounted on the front of said central section, at least one connector being mounted on said superstructure, means for pivotally connecting the adjacent end portions of the front and rear frame members of said central and end sections about longitudinal axes, and means for limiting downwardly tilting of said end sections at a predetermined angle relative to said central section.

3. A lift type agricultural implement comprising a central section and two end sections, each section comprising a rigid frame mounting ground working elements, a rigid superstructure mounted at the central forward portion of said central section, a plurality of spaced connectors mounted in transversely and vertically spaced relation on said central section at the front central portion of the frame and superstructure thereof, said end sections being pivoted about longitudinal axes to the opposite sides of said central section for vertical swinging movement between operative position substantially coplanar with said central section and a collapsed position overlying said central section, a rigid link pivoted to one of said connectors and adapted for pivotal connection with a rigid hitch arm intermediate its ends, and a stop carried by the free end of said line to underlie said arm and engage the bottom of said arm when said link is in predetermined angular relation to said arm.

References Cited in the file of this patent
UNITED STATES PATENTS

| | | |
|---|---|---|
| 1,531,975 | Reynolds | Mar. 31, 1925 |
| 1,848,955 | Klise | Mar. 8, 1932 |
| 2,298,161 | Robinson, Jr. | Oct. 6, 1942 |
| 2,336,152 | Rude | Dec. 7, 1943 |
| 2,398,991 | Arps | Apr. 23, 1946 |
| 2,498,888 | Hyland et al. | Feb. 28, 1950 |
| 2,561,548 | Wharam et al. | July 24, 1951 |
| 2,665,622 | Bunting | Jan. 12, 1954 |

FOREIGN PATENTS

| | | |
|---|---|---|
| 556,859 | Great Britain | Oct. 26, 1943 |